Apr. 24, 1923.  
C. C. FISCHER  
1,452,497  
PIPE CLAMP FOR STEAM COILS  
Filed June 29, 1921  
2 Sheets-Sheet 1

INVENTOR:  
Charles C. Fischer  
BY F. H. Libbe  
ATTORNEY.

Apr. 24, 1923.
C. C. FISCHER
1,452,497
PIPE CLAMP FOR STEAM COILS
Filed June 29, 1921   2 Sheets-Sheet 2
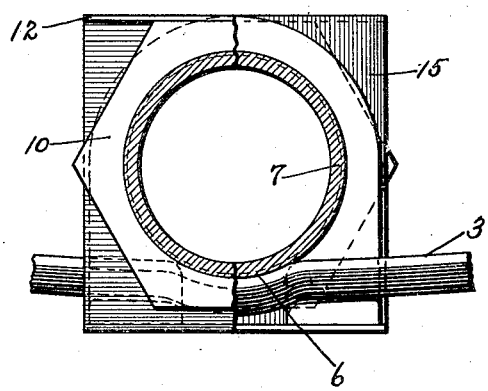
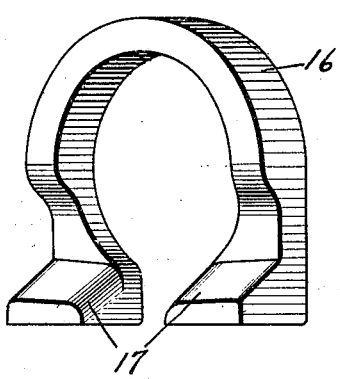
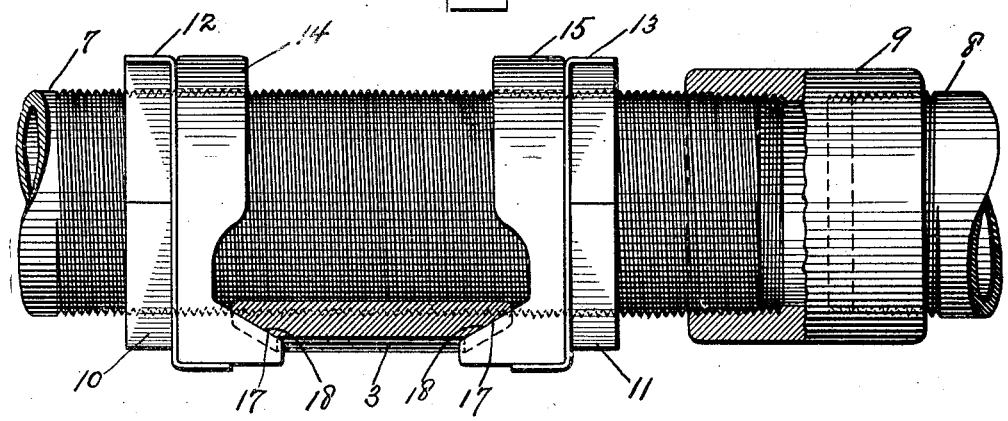
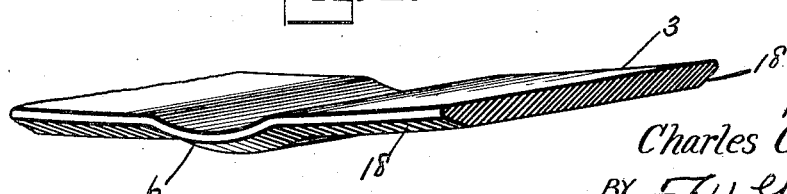
INVENTOR:
Charles C. Fischer
BY J. H. Gibbs
ATTORNEY.

Patented Apr. 24, 1923.

1,452,497

UNITED STATES PATENT OFFICE.

CHARLES C. FISCHER, OF BLOOMFIELD, NEW JERSEY, ASSIGNOR TO AMERICAN CAR AND FOUNDRY COMPANY, OF NEW YORK, N. Y., A CORPORATION OF NEW JERSEY.

PIPE CLAMP FOR STEAM COILS.

Application filed June 29, 1921. Serial No. 481,435.

*To all whom it may concern:*

Be it known that I, CHARLES C. FISCHER, residing at Bloomfield, Essex County, State of New Jersey, and being a citizen of the United States, have invented certain new and useful Improvements in Pipe Clamps for Steam Coils, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 3 is a view partly in end elevation and partly with the clamping member at one side of the supporting member broken away;

Fig. 4 is a side elevation of my improved pipe clamp, the supporting member being shown in section;

Fig. 5 is a view of the clamping member detached from the pipe; and

Fig. 6 is a view of the pipe engaging portion of the supporting member.

Figure 1:
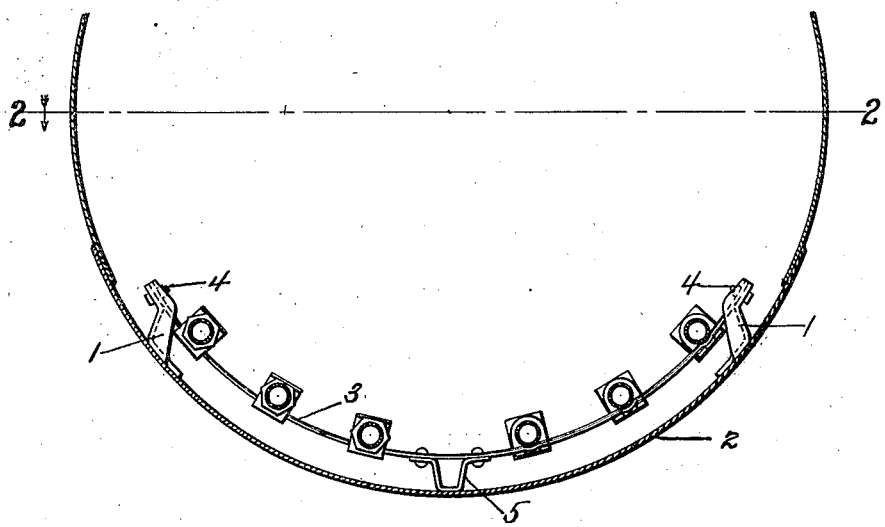
Fig. 1 is a section taken on line 1—1 of Fig. 2 through a car tank provided with my improved clamp for securing the steam coils to the coil support.
Figure 2:
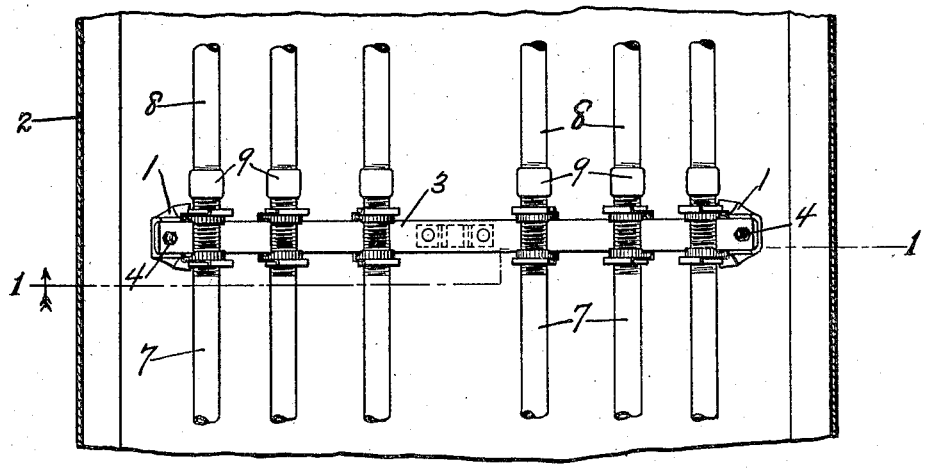
Fig. 2 is a section taken on line 2—2 of Fig. 1 showing my improved clamp in plan view.

It is the object of my invention to provide an improved clamping means for securing the steam coils of car tanks to the supporting member in such a manner that movement of the coils through the clamp is prevented.

In the embodiment of my invention shown in the drawings, brackets 1 riveted or otherwise secured to the tank sheet 2 carry a supporting member 3 secured to the brackets 1 by the bolts 4, a supporting leg 5 is secured to the member 3 at its center and bears against the tank plate 2. The sections of the coil are placed upon the supporting member 3, each section resting in a slight depression 6 formed in the supporting member 3. Each section comprises pipe lengths 7 and 8 connected by a pipe coupling 9. The end of the pipe length 7, which rests upon the supporting member 3, is screw threaded for a portion of its length and the nuts 10 and 11, nut locks 12 and 13 and clamping members 14 and 15 are placed upon the pipe length 7 before the pipe lengths 7 and 8 are connected.

The clamping members 14 and 15 are substantially U-shape and each comprises a strip like portion 16 bent so as to partly encircle the pipe and tapered end portions 17 projecting from the portion 16 at right angles to the plane of the portion 16 and adapted to engage with the tapered portions 18 of the supporting member 3.

In assembling my improved clamp, the nut 10 and nut lock 12 are placed upon the pipe length 7, then the clamping members 14 and 15 with the tapered end portions 17 of the two clamping members extending toward each other, and then the nut lock 13 and nut 11. The pipe section 7 is then placed on the supporting member 3 and the clamping members moved so as to have the tapered portions 17 engaging the tapered portions 18 of the supporting member 3 on opposite sides of the depressed portion 6. The nuts 10 and 11 are then brought to bear against the clamping members 14 and 15 and locked in position by means of the nut locks 12 and 13. The engagement of the pipe length 7 in the depressed portion 6 prevents lateral movement of the pipe 7 on the support 3, the engagement of the tapered portions 17 and 18 prevents the pipe length 7 from being raised from the supporting member 3 and the engagement of the nuts 10 and 11 with the threads on the pipe length 7 and against the clamping members 14 and 15 prevents the longitudinal movement of the pipe length 7 so that the heating coils are held in position despite the jarring to which the tank is subjected when the car is in service. By using my improved clamp at the center support of the coils and using the ordinary clamping means at the other supports, the coils will be permitted to expand when steam is admitted to them and the coils and the improved clamping means will not be subjected to great stress.

What I claim is:

1. In a pipe anchoring means, a fixed support for the pipe having tapered edges, a pipe clamp having tapered projections adapted to engage said edges and means on said pipe adapted to force said projections into engagement with said tapered edges to secure the pipe to the support.

2. In a pipe anchoring means, a fixed support having a depression adapted to receive the pipe, a pipe clamp adapted to engage the support on opposite sides of the depression and means on said pipe adapted to force said clamp into engagement with said support to secure the pipe in the depression.

3. The combination with a pipe of a pipe anchoring means comprising a support for said pipe, U-shaped clamping members adapted to hold said pipe to said support and means carried by said pipe adapted to hold said clamping members in engagement with said support.

4. The combination with a pipe of a pipe anchoring means comprising a support for said pipe, U-shaped clamping members engaging said pipe and having projecting portions engaging said support and nuts, threaded on said pipe, adapted to hold said clamping members in engagement with said support.

5. The combination with a pipe of a pipe anchoring means comprising a support, clamping means carried by said pipe adapted to hold said pipe to said support and means on said pipe holding said clamping means in engagement with said support and adapted, in conjunction with said clamping means, to prevent longitudinal movement of said pipe with respect to said support.

6. The combination with a pipe of a pipe anchoring means comprising a support, U-shaped clamping means engaging said pipe and having projecting portions engaging said support and means engaging said clamping means and adapted, in conjunction with said clamping means, to prevent longitudinal movement of said pipe with respect to said support.

7. A pipe anchoring means comprising a support, clamping means carried by said pipe and means on said pipe adapted, in conjunction with said clamping means, to prevent longitudinal movement of said pipe with respect to said support and to force said pipe into engagement with said support.

In witness whereof I have hereunto set my hand in the presence of two witnesses.

CHARLES C. FISCHER.

Witnesses:
  E. G. WEBSTER,
  R. W. SMITH.